United States Patent [19]
Weger, Jr. et al.

[11] Patent Number: 5,829,654
[45] Date of Patent: Nov. 3, 1998

[54] CARGO RACK FOR VEHICLES

[75] Inventors: Kenneth F. Weger, Jr., Cary; Freddie C. Webb, Crystal Lake; Gerald A. Draffkorn, Jr., Woodstock, all of Ill.

[73] Assignee: Knaack Manufacturing Company, Crystal Lake, Ill.

[21] Appl. No.: 778,376

[22] Filed: Dec. 31, 1996

[51] Int. Cl.[6] .................................................. B06R 9/045
[52] U.S. Cl. ........................ 224/322; 224/321; 224/325
[58] Field of Search ................................. 224/309, 314, 224/316, 320, 321, 322, 324, 325, 326, 329, 330, 331

[56] References Cited

U.S. PATENT DOCUMENTS

| | | | |
|---|---|---|---|
| 3,064,868 | 11/1962 | Treydte | 224/331 |
| 3,776,437 | 12/1973 | Carney | 224/321 |
| 3,856,193 | 12/1974 | Bott | 224/316 |
| 3,917,136 | 11/1975 | Carson | 224/331 |
| 4,586,638 | 5/1986 | Prescott et al. | 224/322 |
| 4,721,239 | 1/1988 | Gibbs, III et al. | 224/322 |
| 4,757,929 | 7/1988 | Nelson | 224/322 |
| 4,778,092 | 10/1988 | Grace | 224/322 |
| 5,464,140 | 11/1995 | Hill | 224/322 |

FOREIGN PATENT DOCUMENTS

| | | | |
|---|---|---|---|
| 193501 | 9/1986 | European Pat. Off. | 224/309 |
| 278435 | 8/1988 | European Pat. Off. | 224/309 |
| 1333369 | 6/1963 | France | 224/321 |
| 2612954 | 9/1977 | Germany | 224/316 |
| 3135649 | 3/1983 | Germany | 224/321 |
| 56649 | 4/1985 | Japan | 224/314 |
| 827054 | 2/1960 | United Kingdom | 224/331 |

OTHER PUBLICATIONS

Hauler Racks brochure and price list (9 pages), Nov. 1, 1995.
Weather Guard Van Equipment catalog, Knaack Manufacturing Co., pp. 1 and 34–39, Jun. 1993.
American Van catalog #44, pp. 1,3,4,10 and 11, Jun. 1991.

*Primary Examiner*—Allan N. Shoap
*Assistant Examiner*—Gregory M. Vidovich
*Attorney, Agent, or Firm*—Leydig,Voit & Mayer, Ltd.

[57] ABSTRACT

A rack assembly for securing cargo on a roof of a vehicle. The rack has a pair of mounting bracket assemblies for attaching securely to the roof of a vehicle, a cross member with a plurality of apertures located at predetermined positions between its transverse axis and each of its ends so as to provide pairs of attachment points (each pair defining a unique spacing distance correlating to a different vehicle roof width) and a pair of support assemblies for adjustably coupling between respective mounting bracket assemblies and the cross member to support the cross member above the roof of the vehicle. In order to assure secure and watertight attachment to the roof of a vehicle, each mounting bracket assembly includes a rubber gasket having a substantially flat bottom surface and a concave top surface, a clamp bar having a substantially flat top surface and a convex bottom surface, and a bracket of substantially J-shaped cross-section which is slidably secured between the concave top surface of the gasket and the convex bottom surface of the clamp bar.

20 Claims, 5 Drawing Sheets

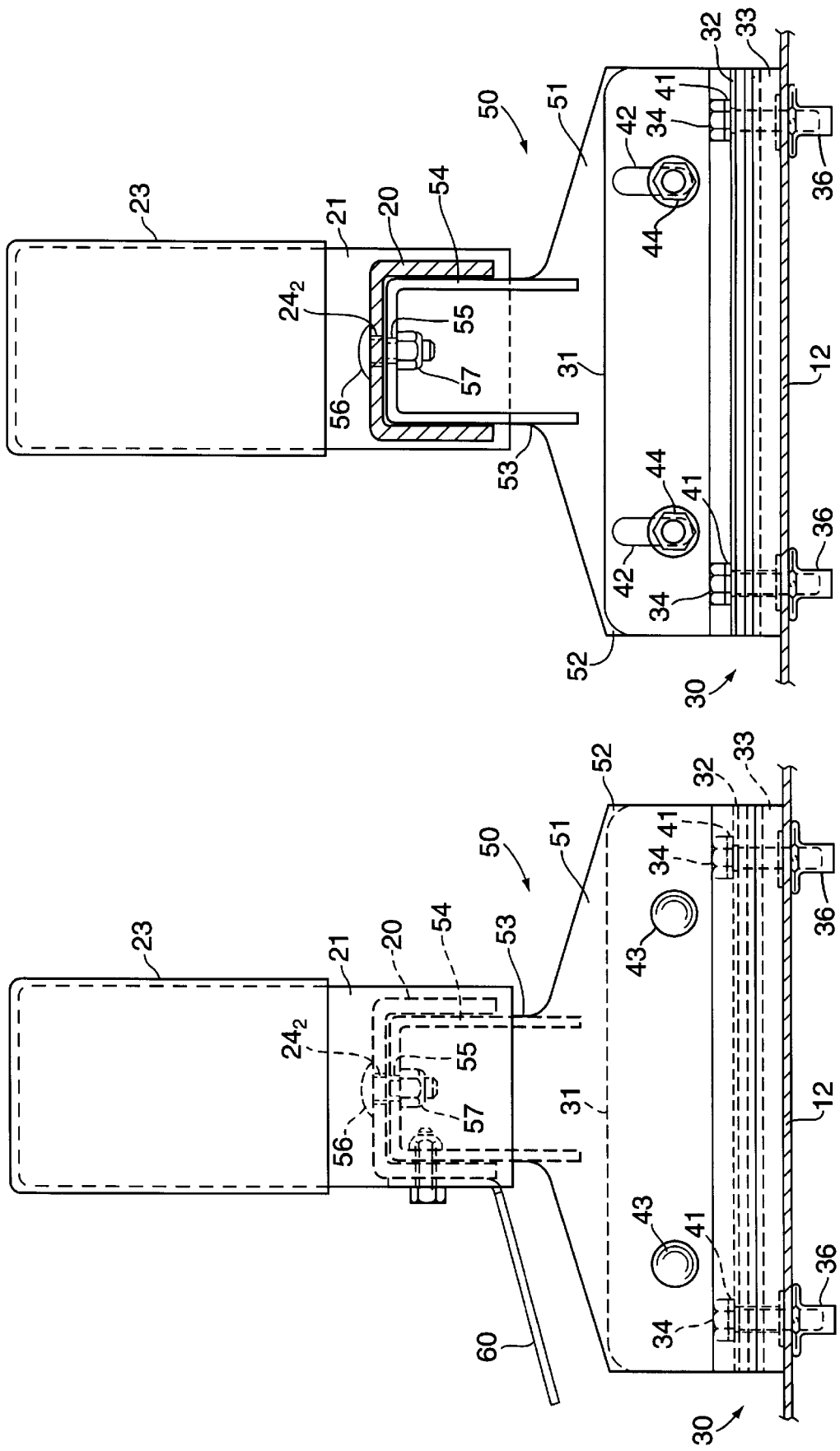

5,829,654

1

CARGO RACK FOR VEHICLES

TECHNICAL FIELD

The present invention relates generally to cargo racks for vehicles, and, more particularly, to a cargo rack which can be adjusted to correlate with several different, predetermined vehicle roof widths.

BACKGROUND ART

Adjustable cargo racks have been known and used in conjunction with vehicles for many years. A rack assembly typically can be adjusted in length completely at the discretion of the user in order to fit the rack to any desired vehicle. Examples of such racks, as manufactured by the assignee of this application, Knaack Manufacturing Company, are the Weather Guard® Model 211 Aluminum All-Purpose Van Rack—which has cross members that slide into and through matching apertures in the end posts so that the distance between the posts can be freely adjusted to fit the roof width of any vehicle—and the Weather Guard® Models 205 and 220 All-Purpose Steel Racks—which have cross members that fit into mating cavities on the end posts and are cut to a desired length by the user to adjust the distance between the posts. While these freely-adjustable designs are acceptable for many vehicles, there are certain vehicles (particularly minivans) for which it is preferable structurally to position the support posts of a cargo rack at specific roof locations. Accordingly, the adjustability of a cargo rack for such a vehicle should preferably not be left entirely to the discretion of the user. Moreover, existing racks are not designed to accommodate either front-to-rear or side-to-side contour variations that often exist in the roofs of commercially-available minivans.

SUMMARY OF THE INVENTION

It is a primary object of the present invention to provide an improved cargo rack having plural predetermined attachment points for the support assemblies, whereby attachment at each of those points results in a unique spacing distance correlating to a different vehicle roof width.

Another object of this invention is to provide such an improved cargo rack having mounting bracket assemblies which ensure secure and watertight mounting on the roof of a vehicle, and which permit the user to adjust the rack to accommodate side-to-side roof contour variations.

A further object of this invention is to provide such an improved cargo rack having coupling mechanisms between the rack's support assemblies and mounting bracket assemblies which permit the user to adjust the rack to accommodate front-to-rear roof contour variations.

Other objects and advantages of the invention will be apparent from the following detailed description.

In accordance with the present invention, a cargo rack is provided having a pair of mounting bracket assemblies for attaching securely to the roof of a vehicle, a cross member with a plurality of apertures located at predetermined positions between its transverse axis and each of its ends so as to provide pairs of attachment points (each pair defining a unique spacing distance correlating to a different vehicle roof width), and a pair of support assemblies for adjustably coupling between respective mounting bracket assemblies and the cross member to support the cross member above the roof of the vehicle. In order to assure secure and watertight attachment to the roof of a vehicle, each mounting bracket assembly includes a rubber gasket having a substantially flat bottom surface and a concave top surface, a clamp bar having a substantially flat top surface and a convex bottom surface, and a bracket of substantially J-shaped cross-section which is slidably secured between the concave top surface of the gasket and the convex bottom surface of the clamp bar.

BRIEF DESCRIPTION OF THE DRAWINGS

FIG. 3 is an end plan view of the cargo rack taken along the line 3—3 in FIG. 2;

FIG. 4 is a sectional plan view of the cargo rack taken along the line 4—4 in FIG. 2;

DESCRIPTION OF THE PREFERRED EMBODIMENTS

While the invention will be described in connection with particular preferred embodiments, it will be understood that it is not intended to limit the invention to those particular embodiments. On the contrary, it is intended to cover all alternatives, modifications and equivalents as may be included within the spirit and scope of the invention as defined by the appended claims.

Figure 1:
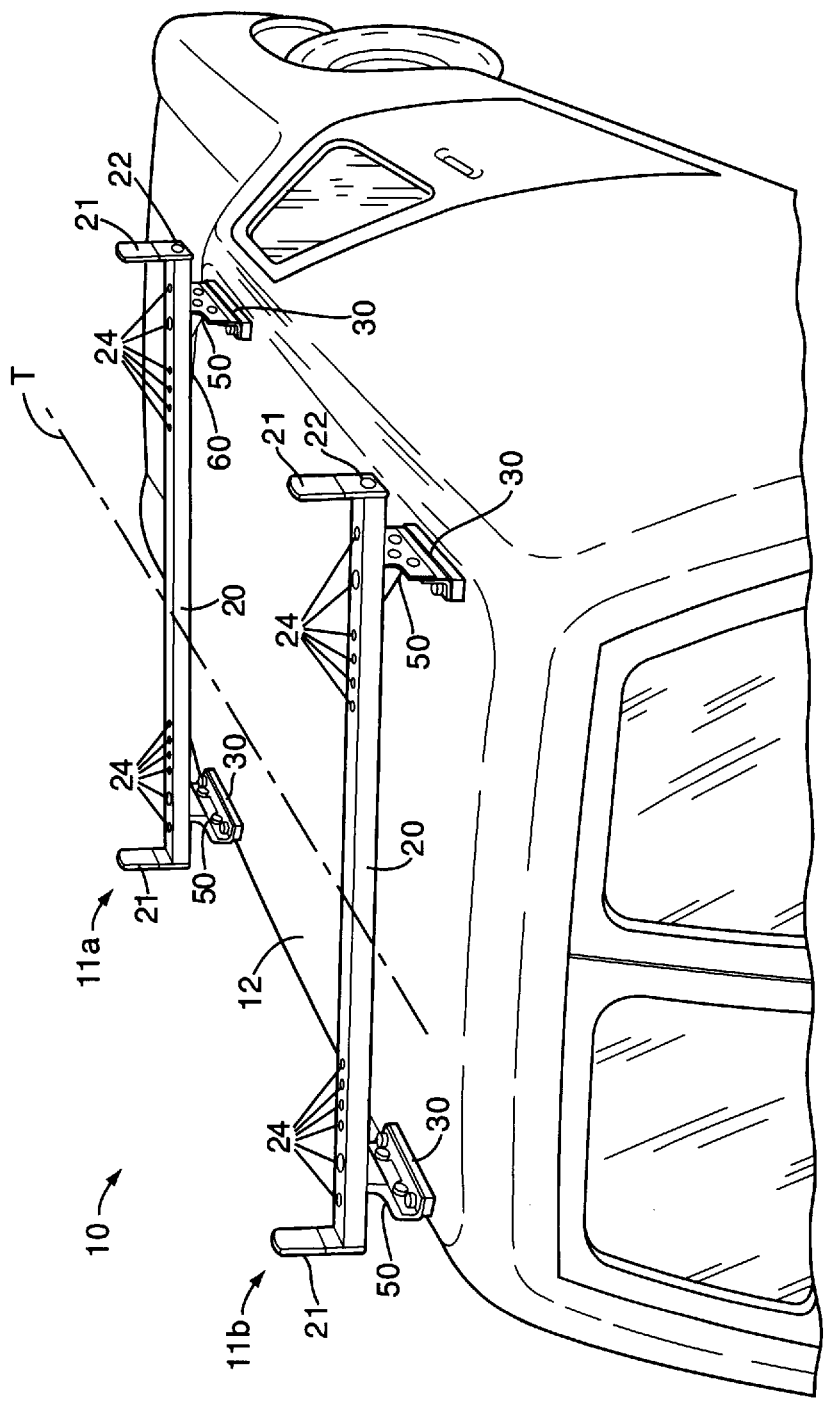
FIG. 1 is a perspective view showing two separate cargo rack assemblies mounted on the roof of a vehicle, such as a minivan.

Turning now to the drawings and referring first to FIG. 1, there is shown generally a rack 10 for securing cargo to the roof of a vehicle. The rack includes at least a forward assembly 11a and a similar rearward assembly 11b, each of which has a cross bar 20 (on which cargo may be secured), a pair of mounting bracket assemblies 30 (which secure to the roof 12 of the vehicle) and a pair of support assemblies 50 (which couple between a respective mounting bracket assembly and the cross bar). A plurality of apertures 24 are formed in each cross bar, with half of the apertures being on a first side of its transverse axis (T) and the other half being located on the second side of the transverse axis. In accordance with an important aspect of the invention, the plurality of apertures are located at predetermined positions between the transverse axis (T) and one end or the other of the cross bar so as to provide pairs of apertures that are equidistant from the transverse axis. Each resulting equidistant pair of apertures defines a unique spacing distance correlating to a different vehicle roof width. By utilizing particular equidistant pairs of apertures, a user can position the support assemblies and mounting bracket assemblies at appropriate predetermined spacing distances from one another so that the rack assembly will mount properly (with each mounting bracket assembly contacting a desired roof location) on the roof of a commercial vehicle, such as a minivan.

More specifically, as shown in FIGS. 2–6, each rack assembly has an elongate cross bar 20 which generally spans the roof 12 of the vehicle upon which the rack assembly is mounted. In a preferred embodiment, the cross bar 20 has an inverted-U channel cross-sectional configuration (see FIGS. 3–5) and is formed from ³⁄₁₆inch extruded aluminum. Each end of the cross bar terminates in a vertical stop 21, formed by welding an aluminum plate to each end. Each vertical stop preferably includes an aperture 22 (see FIGS. 1, 2 and 6) through which a rope or the like can be threaded for securing cargo to the cross bar 20. If desired, the upward extending portion of the vertical stops 21 may be capped with a plasticized or rubberized material 23 for decorative purposes.

Figure 2:
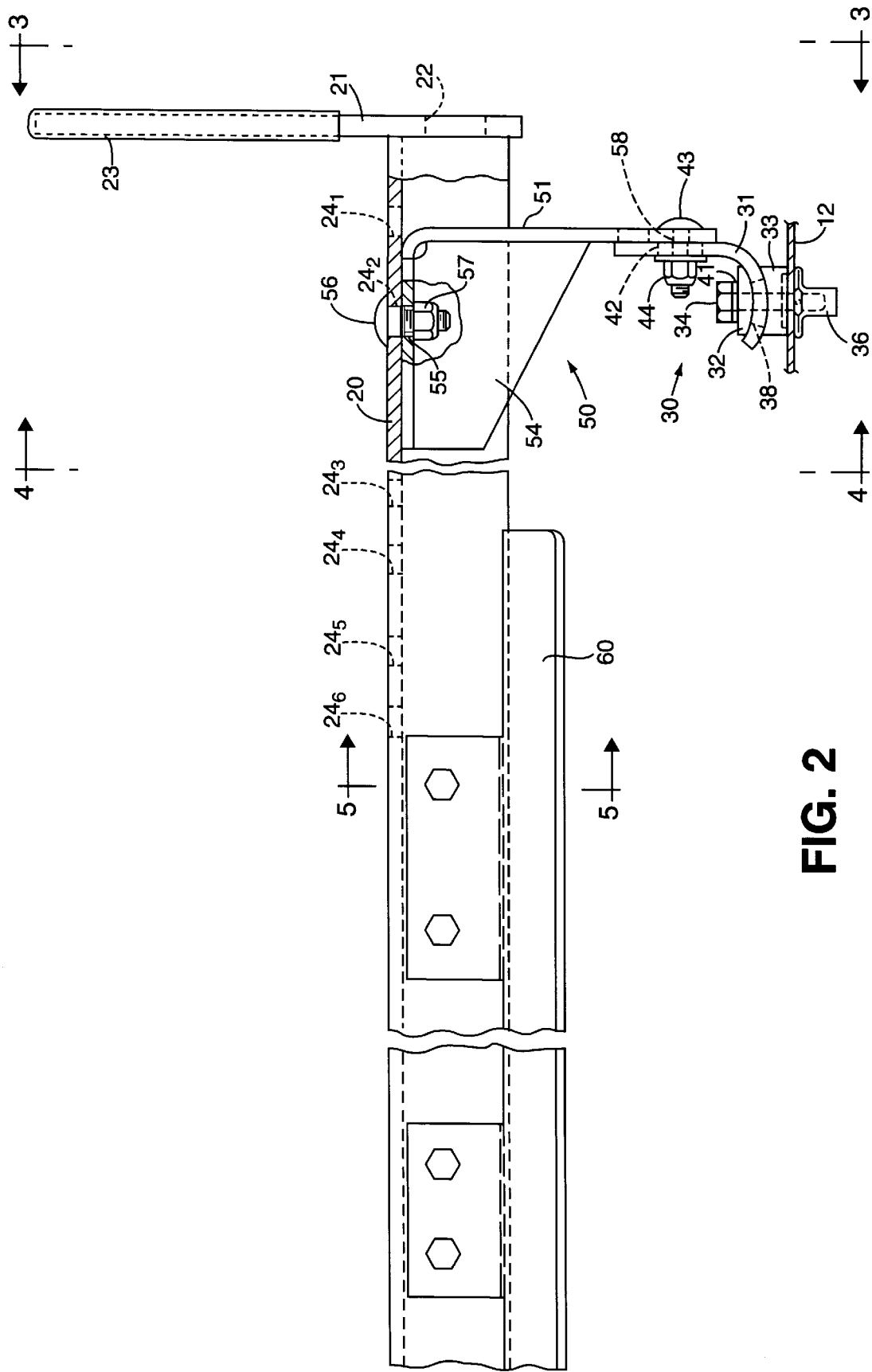
FIG. 2 is a side plan view of one end of the cargo rack.
Figure 5:
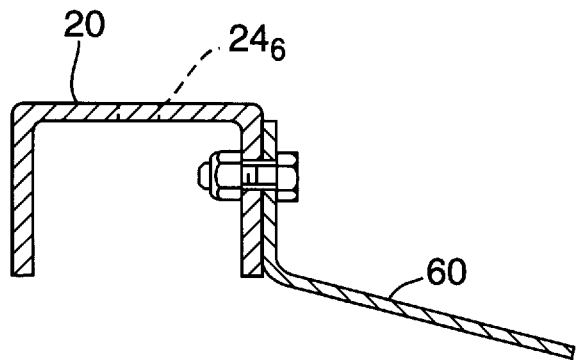
FIG. 5 is a cross-sectional view of the cargo rack taken along the line 5—5 in FIG. 2.
Figure 7:
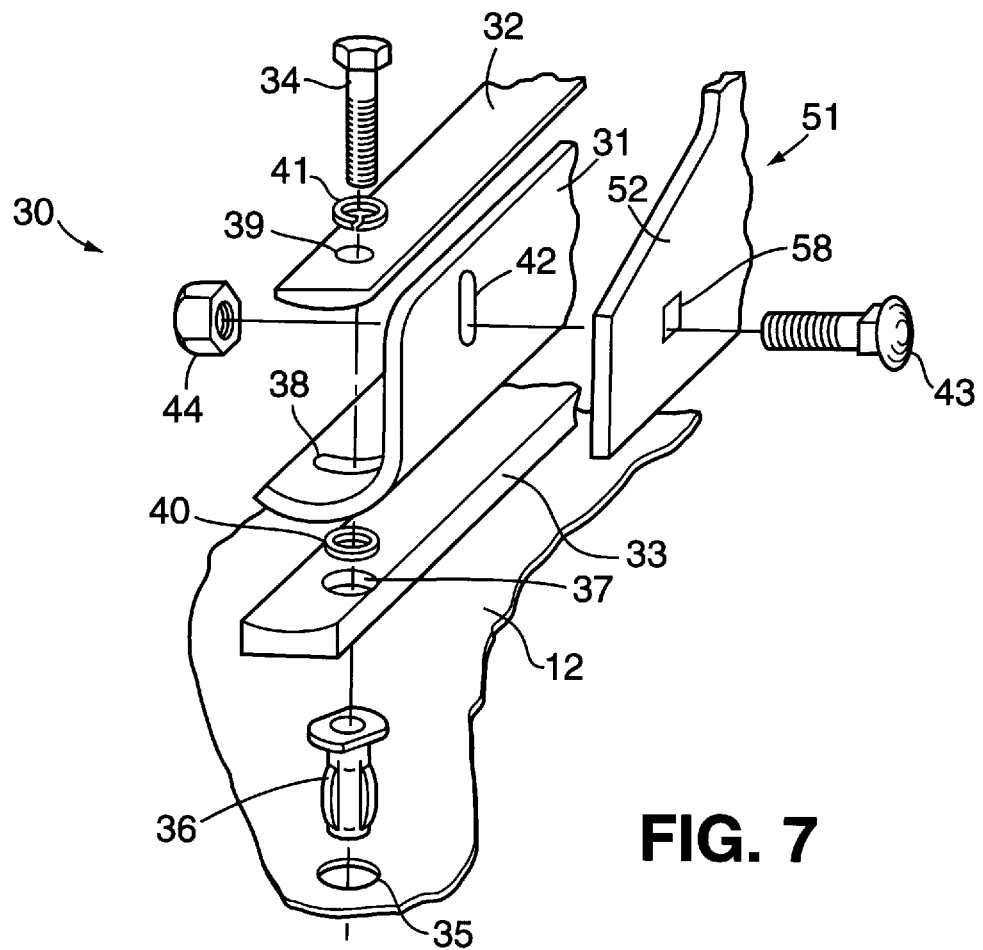
FIG. 7 is an exploded perspective view of the mounting bracket assembly of the cargo rack.
Figure 6:
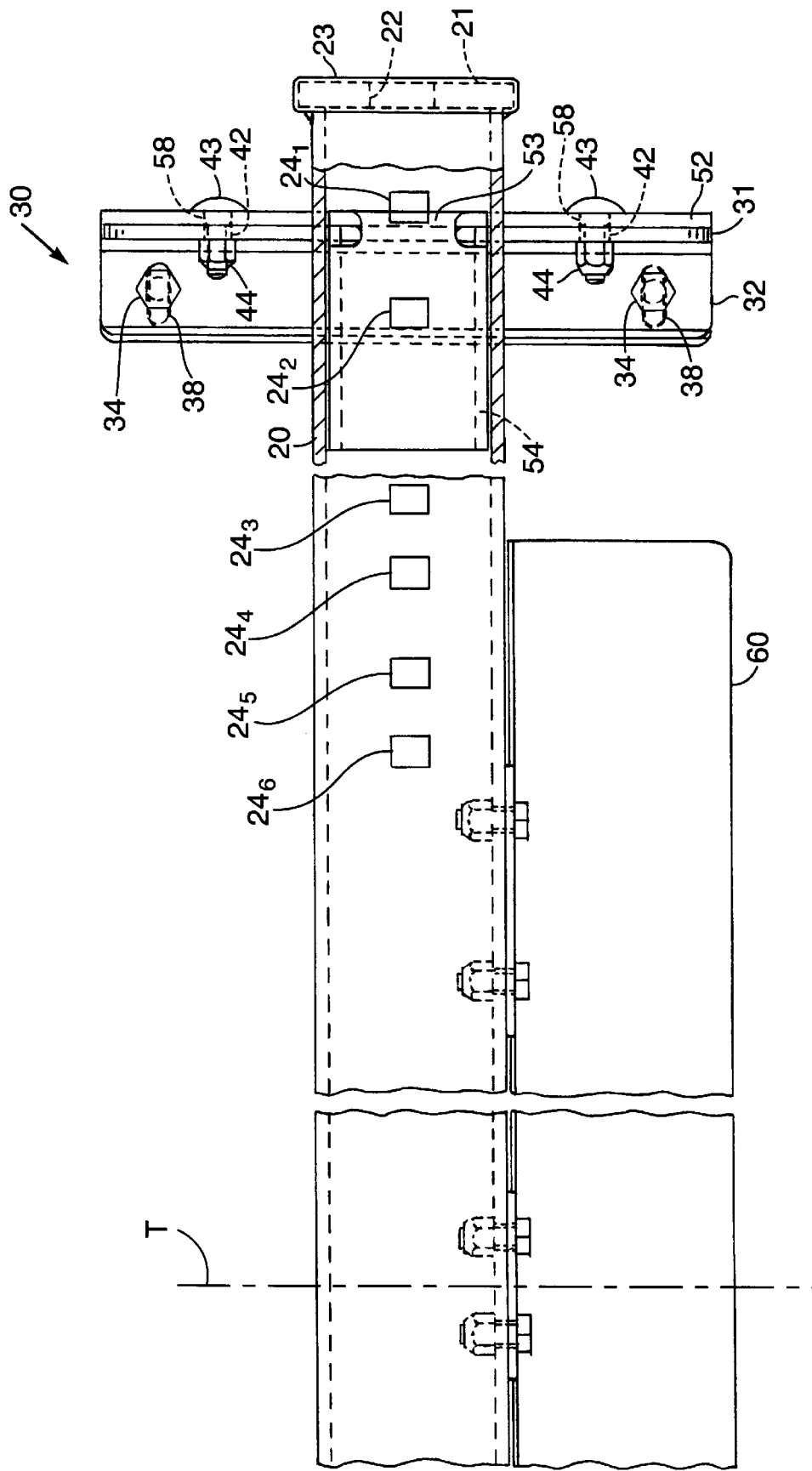
FIG. 6 is a top plan view of an end of the cargo rack.

In accordance with an important aspect of the present invention, the cross bar 20 includes a plurality of apertures in the horizontal segment of the U-shaped channel. It will be appreciated that these apertures could just as effectively be formed in one or both of the vertical segments of the U-shaped channel. The apertures 24 are divided such that half of them lie on one side of the transverse axis (T) and the other half of them lie on the other side of this axis, thereby forming a plurality of aperture pairs which lie equidistant from the transverse axis. As shown in FIGS. 2 and 6, a preferred embodiment of the cross bar includes six apertures on each side of the transverse axis: a first ($24_1$) which is formed approximately 27 inches away from the transverse axis; a second ($24_2$) approximately 25 inches away; a third ($24_3$) approximately 22 inches away; a fourth ($24_4$) approximately 21 inches away; and a fifth ($24_5$) and sixth $24_6$ apertures whose positions are not as critical. The first four of these apertures ($24_1$–$24_4$), in combination with four corresponding apertures at the other end of the cross bar 20, form four aperture pairs, with each of the apertures in a pair lying equidistant from the transverse axis (T).

As will be appreciated, each aperture pair defines a unique spacing distance. In the preferred embodiment, the four spacing distances (from center-to-center of the "paired" apertures) are approximately 54 inches, 49⅜ inches, 43¾ inches and 42¼ inches. These four spacing distances correlate, respectively to the front roof width of a Chevrolet Astro minivan, the rear roof width of a Chevrolet Astro minivan, the front/back roof width of a Ford Windstar minivan, and the front/back roof width of a Dodge Caravan minivan or a Ford Aerostar minivan.

The other two apertures ($24_5$, $24_6$) provide mounting locations for a ladder stop accessory (not shown).

As illustrated in FIGS. 2–4 and 6, the cross bar 20 is coupled to the roof 12 of a vehicle at each of two locations via a mounting bracket assembly 30 and a support assembly 50. In a preferred embodiment, the support assembly 50 is comprised of a rigid support upright (formed from a bent aluminum plate) having a vertical component and a substantially horizontal component. As best shown in FIGS. 3 and 4, the vertical component of the support assembly 50 is a plate member 51 having an inverted-T configuration (with a wide (8 inch) base portion 52 and a relatively narrow neck portion 53). The neck portion 53 of the vertical component culminates in the horizontal component which consists of an inverted-U channel 54. This inverted-U channel 54 nests within the inverted-U channel of the cross bar 20, thereby providing a rigid and stable support structure for the rack assembly. For purposes of positioning the support assembly 50 in relation to the cross bar 20, an aperture 55 in the inverted-U channel 54 of the support assembly is aligned with one of the apertures ($24_1$–$24_4$) in the cross bar. An appropriate fastener (for example, a carriage bolt 56) is passed through the aligned apertures, and a lock nut 57 is then used to secure the inverted U-channel 54 to the cross bar 20.

In a preferred embodiment, the mounting bracket assembly 30 includes multiple components which, in combination, enable a user to adjust the rack assembly 10 so that it can be securely mounted on the roof 12 of a vehicle even if it has side-to-side and/or front-to-rear contour variations. Referring to FIGS. 2–4, it will be seen that the mounting bracket assembly includes three primary components: a metal bracket 31 having a substantially J-shaped cross-section, a metal clamp bar 32 and a gasket member (or mounting pad) 33 made of a flexible, resilient material such as polyurethane or rubber. The clamp bar 32 has a substantially flat top surface (to provide a firm seating surface for the head of a bolt 34) and a convex bottom surface which nests with the curved lower portion of the J-shaped bracket 31. Likewise, this lower portion of the J-shaped bracket nests with the concave top surface of the gasket member 33, and the flat bottom surface of the gasket provides a stable mounting base and helps to seal the mounting aperture 35 in the vehicle roof 12 against moisture penetration.

For purposes of mounting the rack assembly 10, a plusnut 36 is first installed (see FIGS. 2–4) in each roof aperture 35 in accordance with a well-known procedure. Next, the gasket member 33, the J-shaped bracket 31 and the clamp bar 32 are nested such that apertures extending through each of them (respectively, 37, 38 and 39) are aligned. Bolts 34 are inserted through the aligned apertures (and also through spacers 40 positioned between the gasket 33 and the bracket 31) and are threaded into the installed plusnuts 36. Lock washers 41 secure the bolts in place. Finally, apertures 58 in the vertical plate member 51 of the support assembly are aligned with apertures 42 in the upper portion of the J-shaped bracket 31, and the plate member and the bracket are coupled to one another by means of a carriage bolt 43 and a lock nut 44.

In accordance with important aspects of the present invention, each of the apertures 38, 42 in the J-shaped bracket 31 is provided as an elongated slot. The slotted apertures provide the rack with added adjustment capabilities and facilitate mounting on the vehicle. With the slotted apertures, it is possible to separately adjust each of the four support assemblies to tilt the rack, to compensate for front-to-rear variations in the roof contour and to compensate for side-to-side variations in the roof contour.

By way of illustration, because of the slotted configuration of the apertures 38 in the lower portion of the J-shaped bracket 31, the bracket can slide between the clamp bar 32 and the gasket 33, thereby enabling firm and watertight attachment of the mounting bracket assembly 30 (and the rack assembly 10) to the vehicle roof even when there are side-to-side contour variations. Similarly, the slotted configuration of the apertures 42 in the upper portion of the J-shaped bracket 31 enable slidable adjustment between the bracket and the plate 51 of the support assembly, thereby enabling firm and watertight attachment of the mounting bracket assembly 30 to the vehicle roof even when there are front-to-rear contour variations.

In order to diminish vibration of the rack assembly 10 while the vehicle is being driven, a forward-extending air foil 60 is provided on the cross bar 20 of the forward rack assembly 11a. This foil is preferably constructed from $\frac{1}{10}^{th}$ inch aluminum sheet, so that it can be bent to any desired angle to maximize the deflection of air (which normally would pass under the cross bar and cause vibration).

As can be seen from the foregoing detailed description, the present invention provides an improved, yet versatile vehicular cargo rack having plural predetermined attachment points for the support assemblies, whereby attachment at each of those points results in a unique spacing distance correlating to a different vehicle roof width. The predetermined attachment points facilitate assembly, minimize assembly time, and eliminate the user's need to independently configure the rack for a specific vehicle. Furthermore, the present invention provides a cargo rack which can be adjusted by the user to accommodate side-to-side and/or front-to-rear roof contour variations, and still obtain a stable, water-tight mount.

What is claimed is:

1. A rack assembly for securing cargo on a roof of a vehicle, comprising:
    a pair of mounting bracket assemblies configured to attach securely to the roof of the vehicle, each comprising:
        a gasket having a substantially flat bottom surface and a concave top surface;
        a clamp bar having a substantially flat top surface and a convex bottom surface; and
        a bracket of substantially J-shaped cross-section having a vertical portion and a curved lower portion;
    a cross member to which cargo can be secured, the member including a plurality of attachment points located at predetermined positions between its transverse axis and each of its ends so as to provide pairs of attachment points that are equidistant from the transverse axis, wherein each resulting equidistant pair of attachment points defines a unique spacing distance correlating to a different vehicle roof width; and
    a pair of support assemblies, each of which is coupled between a respective mounting bracket assembly and the cross member such that the cross member is supported above the roof of the vehicle, wherein the pair of support assemblies is attached to the cross member at positions corresponding to one of the equidistant pairs of attachment points and wherein each bracket assembly is securable to the roof of the vehicle by a fastener, with the curved lower portion of the bracket slidably coupled between the convex bottom surface of the clamp bar and the concave top surface of the gasket.

2. The rack assembly of claim 1, wherein the attachment points of the cross member comprise a plurality of apertures, and each support assembly includes an aperture for matching with an aperture in the cross member,
    whereby the aperture of a support assembly is aligned with one of the plurality of apertures in the cross member to receive a fastener to secure the cross member to the support assembly.

3. The rack assembly of claim 1, wherein the cross member further comprises an air foil for deflecting air.

4. The rack assembly of claim 1, wherein the cross member includes a stop member at each of its ends for retaining cargo on the cross member, at least one of the stop members having an aperture through which a rope can be threaded for securing cargo to the cross member.

5. The rack assembly of claim 1, wherein the cross member comprises an inverted U-channel.

6. The rack assembly of claim 5, wherein each support assembly includes an inverted U-channel portion which nests within the inverted U-channel of the cross member.

7. The rack assembly of claim 1, wherein the curved lower portion of the bracket includes at least one elongate aperture through which the fastener passes and swivels so that the rack assembly can be securely attached to the roof of the vehicle notwithstanding side-to-side contour variations in the roof.

8. The rack assembly of claim 1, wherein the equidistant pairs of attachments points define at least two unique spacing distances of approximately 54 inches and 49⅜ inches.

9. The rack assembly of claim 1, wherein the equidistant pairs of attachment points define at least three unique spacing distances of approximately 54 inches, 49⅜ inches and 42¼ inches.

10. The rack assembly of claim 1, wherein the equidistant pairs of attachment points define four unique spacing distances of approximately 54 inches, 49⅜ inches, 43¾ inches and 42¼ inches.

11. A rack assembly for securing cargo on a roof of a vehicle, comprising:
    a pair of mounting bracket assemblies, each of which is adapted to cooperate with a fastener that is passed through the roof of the vehicle for use in maintaining an engagement between the roof and the mounting bracket assembly, and each comprising:
        a gasket having a concave top surface;
        a clamp bar having a convex bottom surface; and
        a bracket which has a substantially J-shaped cross-section having a vertical portion and a curved lower portion such that the curved lower portion of the bracket slidably couples between the convex bottom surface of the clamp bar and the concave top surface of the gasket for fixedly positioning the bracket into any one of a plurality of upright orientations;
    a cross member to which cargo can be secured, the cross member including a plurality of attachment points located at predetermined positions between its transverse axis and each of its ends so as to provide pairs of attachment points that are equidistant from the transverse axis, wherein each resulting equidistant pair of attachment points defines a unique spacing distance correlating to a different vehicle roof width; and
    a pair of support assemblies, each of which is attached to the bracket of a corresponding one of the mounting bracket assemblies and to the cross member at positions corresponding to one of the equidistant pairs of attachment points such that the cross member is supported above the roof of the vehicle.

12. The rack assembly of claim 11, wherein the attachment points of the cross member comprise a plurality of apertures, and each support assembly includes an aperture for matching with an aperture in the cross member.

13. The rack assembly of claim 11, wherein the cross member includes a stop member at each of its ends for retaining cargo on the cross member, at least one of the stop members having an aperture through which a rope can be threaded for securing cargo to the cross member.

14. The rack assembly of claim 11, wherein the cross member comprises an inverted U-channel and each support assembly includes an inverted U-channel portion which nests within the inverted U-channel of the cross member.

15. The rack assembly of claim 11, wherein each support assembly has an aperture and each bracket of the mounting bracket assemblies has at least one elongated aperture which aligns with the aperture in the corresponding support assembly, thus permitting adjustable coupling therebetween for allowing the support assemblies to be positioned in one of a plurality of different heights, and wherein the bracket is further adapted to engage with the fastener for use in maintaining the bracket in the one of the plurality of upright orientations.

16. A rack assembly for securing cargo on a roof of a vehicle, comprising:
    a pair of mounting bracket assemblies, each of which is adapted to cooperate with a fastener which is passed through the roof of the vehicle for use in maintaining an engagement between the roof and the mounting bracket assembly, and each comprising:
        a gasket having a concave top surface;

a clamp bar having a convex bottom surface; and a bracket of substantially J-shaped cross-section having a vertical portion and a curved lower portion wherein the curved lower portion of the bracket slidably couples between the convex bottom surface of the clamp bar and the concave top surface of the gasket for maintaining the bracket in any one of a plurality of upright orientations;

a cross member having a generally inverted U-shaped cross section to which cargo can be secured, the cross member including a plurality of attachment points located at predetermined positions between its transverse axis and each of its ends so as to provide pairs of attachment points that are equidistant from the transverse axis, wherein each resulting equidistant pair of attachment points defines a unique spacing distance correlating to a different vehicle roof width; and a pair of support assemblies, each of which has a generally inverted U-shaped portion which nests within the U-shaped cross section of the cross member, wherein each of the support assemblies is attached to a corresponding one of the mounting brackets and to the cross member at a position corresponding to one of the equidistant pairs of attachment points such that the cross member is supported above the roof of the vehicle.

17. The rack assembly of claim 16, wherein the attachment points of the cross member comprise a plurality of apertures, and each support assembly includes an aperture for matching with an aperture in the cross member.

18. The rack assembly of claim 16, wherein the cross member includes a stop member at each of its ends for retaining cargo on the cross member, at least one of the stop members having an aperture through which a rope can be threaded for securing cargo to the cross member.

19. The rack assembly of claim 16, wherein the curved lower portion of the bracket includes at least one elongated aperture through which the fastener passes.

20. The rack assembly of claim 16, wherein each said bracket having at least one elongated aperture therethrough which aligns with a corresponding aperture in a respective one of said support assemblies, thus permitting adjustable coupling between the bracket and the support assembly so that the rack assembly can be securely attached to the roof of the vehicle notwithstanding front-to-rear contour variations in the roof.

\* \* \* \* \*